United States Patent
Wyatt et al.

[11] Patent Number: 5,839,284
[45] Date of Patent: Nov. 24, 1998

[54] IMAGE INTENSIFIER TV INTEGRAL THERMAL CONTROL SYSTEM

[75] Inventors: William G. Wyatt; Kirk A. Miller, both of Plano; Richard D. DeLaMatyr, Heath; Larry G. Taunton, Richardson, all of Tex.

[73] Assignee: Raytheon TI Systems, Inc., Lewisville, Tex.

[21] Appl. No.: 726,256

[22] Filed: Oct. 4, 1996

Related U.S. Application Data

[60] Provisional application No. 60/004,784 Oct. 4, 1995.
[51] Int. Cl.$^6$ ..................................................... F25B 21/02
[52] U.S. Cl. ............................................. 62/3.2; 62/259.2
[58] Field of Search ................................. 62/3.2, 3.4, 3.6, 62/259.2

[56] References Cited

U.S. PATENT DOCUMENTS

| | | | |
|---|---|---|---|
| 3,126,498 | 3/1964 | Bendell | 62/3.2 |
| 3,141,987 | 7/1964 | Altman | 62/3.2 |
| 3,306,975 | 2/1967 | Donnay | 62/3.2 |
| 3,412,566 | 11/1968 | Townsend | 62/3.2 |
| 3,464,218 | 9/1969 | Buck | 62/3.2 |
| 3,703,639 | 11/1972 | Paxhia et al. | 250/83.3 H |
| 3,751,709 | 8/1973 | Wilson et al. | 315/50 |
| 4,622,822 | 11/1986 | Beitner | 62/3.2 |
| 5,181,382 | 1/1993 | Middlebrook | 62/3.2 |
| 5,398,510 | 3/1995 | Gilley et al. | 62/3.6 |

*Primary Examiner*—William Doerrler
*Attorney, Agent, or Firm*—Baker & Botts, L.L.P.

[57] ABSTRACT

A cooler for an image intensifier system which comprises an image intensifier tube having a face plate. The cold side of a thermoelectric cooler has a hot side and a cold side and is secured to a highly thermally conductive cold plate and the face plate. A highly thermally conductive hot plate contacts the hot side of the thermoelectric cooler. A finned heat sink can be coupled to the thermally conductive hot plate. The thermoelectric cooler is preferably in a state of compression between the cold plate and the hot plate. The system further can include an hermetically sealed region containing the face plate and the cold plate. A desiccant can be disposed within the hermetically sealed region.

8 Claims, 2 Drawing Sheets

IMAGE INTENSIFIER TV INTEGRAL THERMAL CONTROL SYSTEM

This application claims priority under 35 USC § 119(e)(1) of provisional application Ser. No. 60/004,784, filed Oct. 4, 1995.

BACKGROUND OF THE INVENTION

1. Field of the Invention

This invention relates to thermal control and, more specifically, to thermal control of the face plate of an image intensifier tube.

2. Brief Description of the Prior Art

An image intensifier tube is an electronic device which is used for night vision when very dim light, such as, for example, star light, is available. The dim image provided to the image intensifier tube as a result of the limited available light is focused on a photocathode. By means of electronic amplification techniques, the image on the photocathode is amplified and is caused to excite a phosphor screen. Such a device, when used with an appropriate optical system and placed in front of the human eye, sees an intensified version of the dimly lit image on the photocathode and permits night vision in conditions of almost total darkness.

It has been determined that the image intensifier tube performance rapidly degrades as the temperature of the face plate thereof increases above a nominal value of about 20 degrees C. Though the image intensifier tube may operate at temperatures even at about the 50 degree C. range, the level of performance continually degrades as the temperature increases above 20 degrees C. This becomes a problem when the ambient temperatures are above 20 degrees C., such as, for example, in conditions of summer desert weather. Accordingly, it is desirable to hold the temperature of the image intensifier tube face plate at about 20 degrees C. or less under all ambient temperature conditions in order to obtain optimal performance, even under conditions of high ambient temperatures.

In prior art systems, the entire camera was cooled to not exceed some maximum temperature where performance became unacceptable (e.g. 50° C.) as opposed to holding at a particular temperature level. The image was thus degraded at times and good at times.

It is therefore highly desirable that an image intensifier system be provided wherein the face plate of the image intensifier tube can be controlled at a temperature such as 20 degrees C. or lower. For some image intensifiers or image intensified television cameras, 20 degrees C. is a level at which even lower temperatures do not offer significant improvement. For other image intensifiers or image intensified television cameras, the desired level may be different but achievable.

SUMMARY OF THE INVENTION

In accordance with the present invention, the temperature of the face plate of an image intensifier tube is controlled to a reasonable temperature, such as the 20 degree C. level, by incorporating an integral thermal control technique in conjunction therewith. The thermal control technique encompasses the use of thermoelectric coolers (TECs) packaged between two highly thermally conductive members, preferably metal plates, such as copper or aluminum plates. This package is then sealed as an integral part within the camera system containing the image intensifier tube. The package is preferably sufficiently thin to be placed within the camera between the face plate of the tube and the objective lens optics. Each metal plate has an aperture in a central region thereof to allow an image to be cast by an objective lens onto the sensitive area of the face plate of the image intensifier tube. TECs are spaced around the periphery of and between the metal plates. One plate on the cold side of the TECs, called the cold plate, is also in thermal contact with the face plate of the tube. This plate removes heat from the tube face plate and cools the sensitive area to a temperature of the desired level. The cold plate has a temperature sensor bonded near the aperture to measure temperature. The temperature sensor is used by the TEC control electronics for feedback. The second metal plate, on the hot side of the TECs, is thermally conductively contacting a heat sink for removal of heat. Only the hot metal plate extends out through the camera housing. The heat sink for the hot plate can take various forms, such as a finned surface cooled by flowing cool air thereover. The hot metal plate is sealed to the camera housing by a low thermal conductivity material to avoid air infiltration which can cause problems due to moisture condensation therefrom due to cooling. The volume within the camera adjacent to the cooled surfaces must be maintained with a low partial pressure of water vapor to avoid such condensation. This is accomplished by using a desiccant in the camera volume. The desiccant has sufficient capacity to absorb moisture due to leakage at sealant surfaces. An indicator paper visible through a small window changes color when the capacity of the desiccant is consumed.

The above described solution to the above noted problem has no moving parts if the hot plate heat sink is cooled by the system supplied coolant, for example, cooler air or liquid. For other conditions, a device such as a fan or pump may be required to furnish a coolant. Using a sandwich construction of mounting the TECs between two plates which are bolted together with low thermal conductivity bolts, such as stainless steel in an oversize hole with a wave washer for low heat loss, allows the TEC pellets to be in compression. The TECs operate reliably if maintained in compression in the sandwiched configuration. The TECs are attached with a flexible thermally conductive material such as, for example, thermal RTV (a metal powder filled silicone), thermal grease or Chomerics Chotherm™, a thermally conductive sheet material, to allow for thermal expansion differences. Condensation is controlled by placing the cold surfaces within the enclosed, dehumidified camera housing. The actual cooling load and resulting heat dissipation problems are minimized by mounting the TECs on the cold plate which is in direct thermal contact with the face plate of the image intensifier tube. The cold plate, being a highly thermally conductive material, such as copper or aluminum, minimizes the thermal gradients around the face plate. Use of a cold plate as opposed to mounting the TECs directly on the face plate of the tube allows use of less expensive standard TECs. The multiple TECs can be wired in series for simplicity of control or wired in parallel for increased reliability. If wired in parallel and one TEC fails, others can still provide partial cooling.

DESCRIPTION OF THE PREFERRED EMBODIMENT

Figure 1:
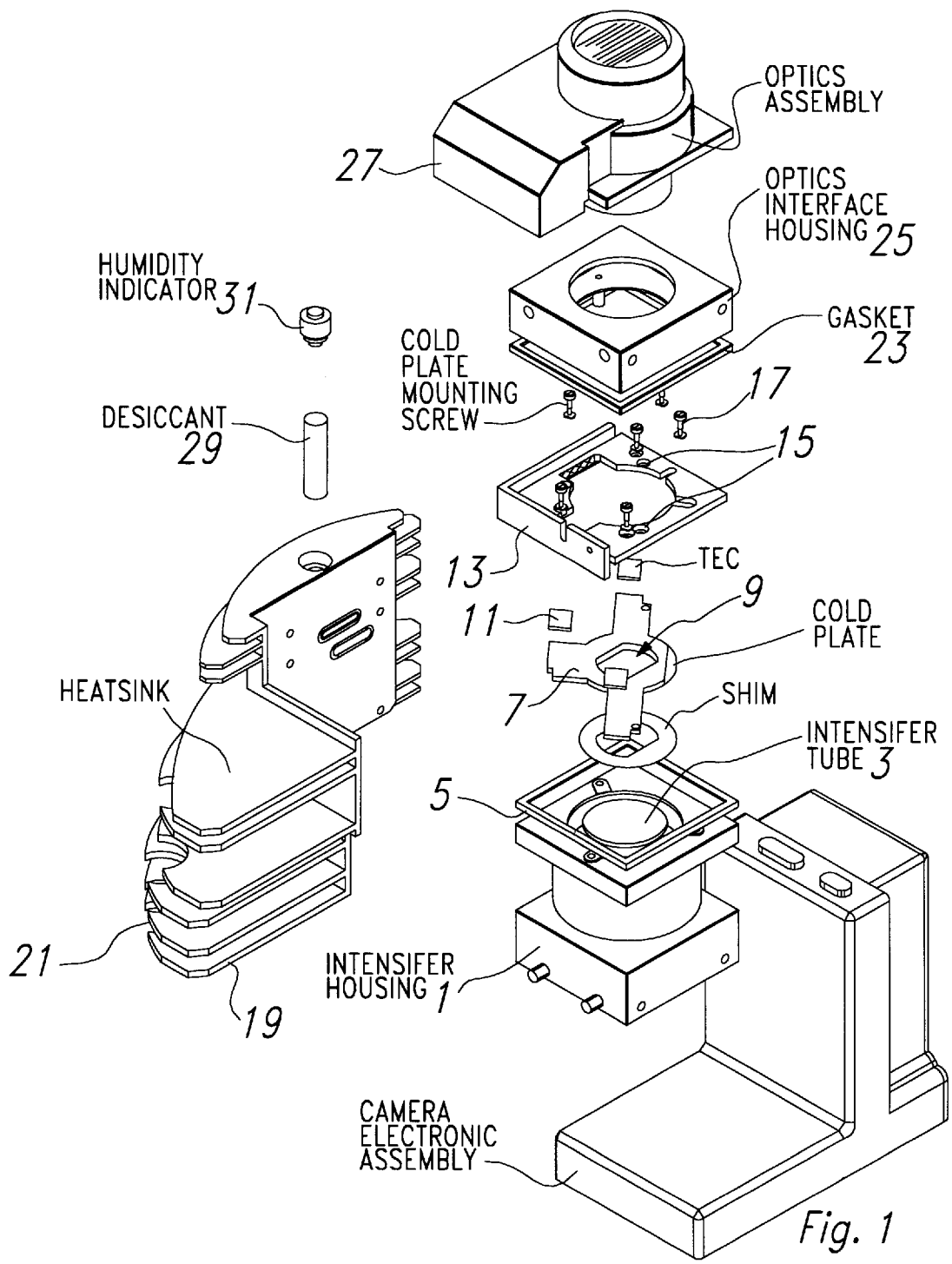
FIG. 1 is an exploded view of an image intensifier system showing the tube cooling structure in accordance with the present invention.
Figure 2:
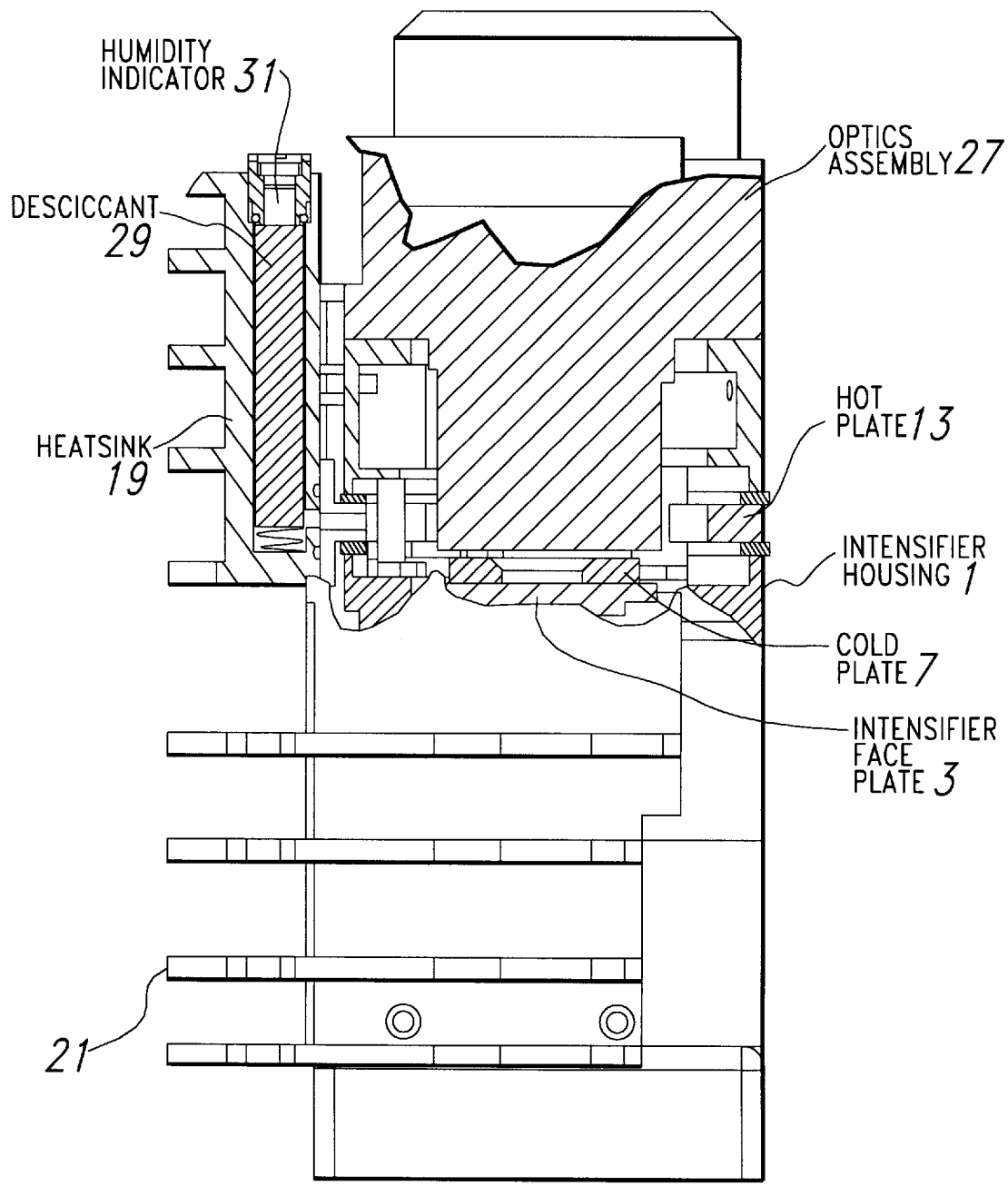
FIG. 2 is a cross sectional view of the structure of FIG. 1 in assembled state.

Referring to the FIGURES, there is shown an image intensifier system in accordance with the present invention.

The system includes a tube housing 1 containing an image intensifier tube therein having a face plate 3. A gasket 5 is secured to the tube housing 1 and around the face plate 3 to provide hermetic sealing to the cooling system in conjunction with the structure to be described hereinbelow. A cold plate 7, which is formed of highly thermally conductive material, preferably copper or aluminum, and has an aperture 9 in the central region thereof to permit image light to impinge upon the face plate 3, is provided with a TEC 11 at each of plural spaced apart regions thereof, out of the path of light which will impinge upon the face plate. Three such TECs are shown. The cold side of each TEC 11 is secured against the cold plate 7, such as with a highly thermally conductive adhesive or adhesive tape (not shown), the cold plate contacting the face plate 3, whereas the hot side of each TEC contacts a highly thermally conductive hot plate 13, preferably made of copper or aluminum. The hot plate 13 is secured to the tube housing by screws and wave washers 17 extending through apertures 15 whereby the hot plate contacts the gasket 5 to provide a preferably hermetic seal therewith. The TECs 11 are preferably maintained in a state of compression between the cold plate 7 and the hot plate 13. A heat sink 19, preferably of copper or aluminum, preferably having fins 21, is secured to the hot plate 13 to extract the heat therefrom and transfer such heat externally of the tube housing 1. Also shown in the figures is a further gasket 23 which is positioned against the side of the hot plate 13 remote from the face plate 3 and against an interface housing 25 in which the objective lens system optics 27 are secured to provide a preferably hermetic cavity therein. A desiccant 29 can be placed adjacent the face plate 3 to minimize the likelihood of moisture condensation on the face plate due to the cooling effect of the TECs 11. A humidity indicator 31 can be used to show the status of the desiccant.

Though the invention has been described with reference to a preferred embodiment thereof, many variations and modifications will immediately become apparent to those skilled in the art. It is therefore the intention that the appended claims be interpreted as broadly as possible in view of the prior art to include all such variations and modifications.

It is claimed:

1. An apparatus, comprising:
   a sealed housing;
   an imaging part having a face plate which is disposed within said housing;
   a lens system having a portion disposed within said housing;
   a highly thermally conductive first plate disposed within said housing between said face plate and said lens system, said first plate having an aperture therethrough, and having a portion which extends around said aperture and is in thermal engagement with an annular portion of said face plate;
   a highly thermally conductive second plate having a portion which is disposed within said housing generally parallel to said first plate, and having a further portion which extends outwardly through said housing to a location external to said housing, said housing having a thermal insulating portion which sealing engages said second plate and substantially prevents a transfer of heat between said second plate and said housing, said second plate having therethrough an opening which is aligned with said aperture through said first plate;
   at least one thermoelectric part disposed between and engaging each of said first and second plates within said housing, said thermoelectric part being operative to transfer heat from one of said first and second plates to the other; and
   a heat sink which is separate from and external to said housing, and which is thermally coupled to said second plate externally of said housing.

2. An apparatus according to claim 1, wherein said housing includes first and second housing portions disposed on opposite sides of said second plate, said first housing portion having said face plate thereon and said second housing portion having said lens system thereon; and wherein said housing includes an annular first gasket which sealingly engages said first housing portion and a surface on one side of said second plate, said first gasket extending around said opening in said second plate; and said housing including an annular second gasket which sealing engages said second housing part and a surface on an opposite side of said second plate from said first gasket, said second gasket extending around said opening in said second plate, and said thermal insulating portion of said housing including each of said first and second gaskets.

3. An apparatus according to claim 1, wherein said lens system has a portion which is disposed axially within said opening through said second plate, said portion of said lens system being free of contact with said second plate.

4. An apparatus according to claim 1, wherein said heat sink includes a plurality of fins.

5. An apparatus according to claim 1, wherein said heat sink has a chamber therein; including a passageway providing communication between said chamber and the interior of said housing, and including a desiccant disposed within said chamber.

6. An apparatus according to claim 5, including a humidity indicator which is supported on said heat sink and is in communication with said chamber therein.

7. An apparatus according to claim 1, including a plurality of said thermoelectric parts which are disposed between said first and second plates at locations spaced circumferentially about said aperture and said opening.

8. An apparatus according to claim 7, wherein said first and second plates apply axially compressive forces to each said thermoelectric part.

* * * * *